(12) United States Patent
Sun

(10) Patent No.: US 9,638,969 B2
(45) Date of Patent: May 2, 2017

(54) LIQUID CRYSTAL DISPLAY (LCD) PANEL, MANUFACTURING METHOD THEREOF AND DISPLAY DEVICE

(71) Applicants: BOE TECHNOLOGY GROUP CO., LTD., Beijing (CN); HEFEI BOE OPTOELECTRONICS TECHNOLOGY CO., LTD., Hefei, Anhui (CN)

(72) Inventor: Dongling Sun, Beijing (CN)

(73) Assignees: BOE TECHNOLOGY GROUP CO., LTD., Beijing (CN); HEFEI BOE OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 0 days.

(21) Appl. No.: 14/837,080

(22) Filed: Aug. 27, 2015

(65) Prior Publication Data

US 2016/0274426 A1    Sep. 22, 2016

(30) Foreign Application Priority Data

Mar. 18, 2015 (CN) .......................... 2015 1 0119707

(51) Int. Cl.
*G02F 1/1339* (2006.01)
*G02F 1/1362* (2006.01)
(Continued)

(52) U.S. Cl.
CPC .... *G02F 1/136204* (2013.01); *G02F 1/13394* (2013.01); *G02F 1/13454* (2013.01);
(Continued)

(58) Field of Classification Search
CPC .......... G02F 1/136204; G02F 1/13394; G02F 2001/13396; G02F 2001/13415
(Continued)

(56) References Cited

U.S. PATENT DOCUMENTS 7,667,798 B2    2/2010    Nakagawa
2003/0025868 A1*  2/2003   Hiroshima .......... G02F 1/13394
                                                  349/156
(Continued)

FOREIGN PATENT DOCUMENTS

CN    1400500 A    3/2003
CN    1550829 A    12/2004
(Continued)

OTHER PUBLICATIONS

First Chinese Office Action dated Jan. 25, 2017; Appln. 201510119707.9.

*Primary Examiner* — Thanh-Nhan P Nguyen
(74) *Attorney, Agent, or Firm* — Ladas & Parry LLP

(57) ABSTRACT

A liquid crystal display (LCD) panel, a manufacturing method thereof and a display device are provided. The LCD panel includes an array substrate and a color filter substrate which are cell-assembled. Liquid crystals are filled between the array substrate and the color filter substrate. A sealant is disposed between peripheral areas of the array substrate and the color filter color filter substrate to seal the array substrate and the color filter substrate, wherein an electrostatic protection layer is also disposed at the peripheral area of the array substrate and configured to cover a peripheral circuit at the peripheral area of the array substrate to provide electrostatic protection for the peripheral circuit.

7 Claims, 3 Drawing Sheets

(51) Int. Cl.
  *G02F 1/1335* (2006.01)
  *G02F 1/1345* (2006.01)
(52) U.S. Cl.
  CPC .................. *G02F 1/133512* (2013.01); *G02F 2001/13396* (2013.01)
(58) Field of Classification Search
  USPC ........................................... 349/40, 155–157
  See application file for complete search history.

(56) References Cited

U.S. PATENT DOCUMENTS

| | | | |
|---|---|---|---|
| 2005/0000982 A1* | 1/2005 | Ryu ...................... | G01F 11/021 222/55 |
| 2005/0219456 A1* | 10/2005 | Tadaki .................. | G02F 1/1339 349/156 |
| 2008/0192186 A1* | 8/2008 | Nakagawa ............ | G02F 1/1339 349/106 |
| 2009/0310052 A1* | 12/2009 | Huang ................. | G02F 1/13452 349/40 |
| 2012/0099061 A1* | 4/2012 | Lee ........................ | G02B 5/22 349/110 |

FOREIGN PATENT DOCUMENTS

| | | |
|---|---|---|
| CN | 101630078 A | 1/2010 |
| CN | 101713882 A | 5/2010 |
| CN | 104281307 A | 1/2015 |
| CN | 104375331 A | 2/2015 |

* cited by examiner

US 9,638,969 B2

LIQUID CRYSTAL DISPLAY (LCD) PANEL, MANUFACTURING METHOD THEREOF AND DISPLAY DEVICE

TECHNICAL FIELD

Embodiments of the present disclosure relate to a liquid crystal display (LCD) panel, a manufacturing method thereof and a display device.

BACKGROUND

Thin-film transistor liquid crystal display (TFT-LCD) is a display device with wide size range, low energy consumption and low radiation and comprises an array substrate (e.g., a thin-film transistor (TFT) substrate), a color filter substrate and a liquid crystal layer filled between the array substrate and the color filter substrate. However, it is difficult to avoid the generation of static electricity during the production and application of TFT-LCDs, so products must have good anti-static function. Particularly as for display products adopting the gate driver on array (GOA) technology, the protection of a peripheral circuit of the panel plays a very important role in the electrostatic protection of the products. Therefore, the problem to be solved in the field is to reduce the influence of the static electricity on the peripheral circuit in the display panel and hence ensure the quality of display images.

SUMMARY

An embodiment of the present disclosure relates to an LCD panel, which comprises an array substrate and a color filter substrate which are cell-assembled. Liquid crystals are filled between the array substrate and the color filter substrate. A sealant is disposed between peripheral areas of the array substrate and the color filter substrate to seal a cell formed by the array substrate and the color filter substrate, wherein an electrostatic protection layer is disposed at the peripheral area of the array substrate and configured to cover a peripheral circuit at the peripheral area of the array substrate to provide electrostatic protection for the peripheral circuit.

An embodiment of the present disclosure relates to a display device, which comprises the foregoing LCD panel.

An embodiment of the present disclosure relates to a method for manufacturing an LCD panel, which comprises: forming an electrostatic protection layer at a peripheral area of an array substrate, in which the electrostatic protection layer is configured to cover a peripheral circuit at the peripheral area of the array substrate to provide electrostatic protection for the peripheral circuit; coating a sealant on the peripheral area of one of the array substrate and the color filter substrate, dropping liquid crystal on the other substrate, and allowing the array substrate and the color filter substrate to be cell-assembled; and performing a curing process on the sealant to seal a cell formed by the array substrate and the color filter substrate.

BRIEF DESCRIPTION OF THE DRAWINGS

Simple description will be given below to the accompanying drawings of the embodiments to provide a more clear understanding of the technical proposals of the embodiments of the present disclosure. Obviously, the drawings described below only involve some embodiments of the present disclosure but are not intended to limit the present disclosure.

DETAILED DESCRIPTION

For more clear understanding of the objectives, technical proposals and advantages of the embodiments of the present disclosure, clear and complete description will be given below to the technical proposals of the embodiments of the present disclosure with reference to the accompanying drawings of the embodiments of the present disclosure. Obviously, the preferred embodiments are only partial embodiments of the present disclosure but not all the embodiments. All the other embodiments obtained by those skilled in the art without creative efforts on the basis of the embodiments of the present disclosure illustrated shall fall within the scope of protection of the present disclosure.

Figure 1:
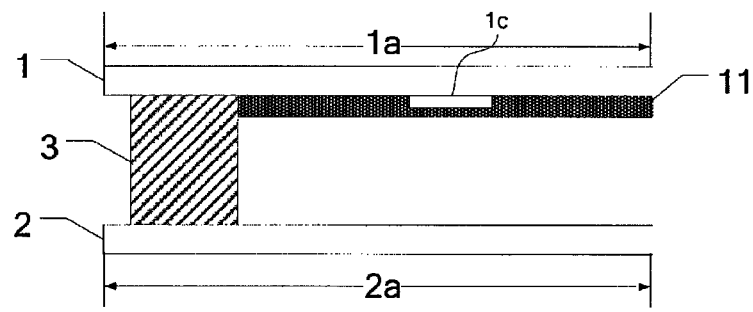
FIG. 1 is a schematic structural partial view of an LCD panel provided by the embodiment of the present disclosure.

FIG. 1 is a schematic structural partial view of an LCD panel provided by the embodiment of the present disclosure. The LCD panel comprises an array substrate 1 and a color filter substrate 2 which are cell-assembled. Liquid crystals are filled between the array substrate 1 and the color filter substrate 2. A sealant 3 is disposed between a peripheral area 1a of the array substrate 1 and a peripheral area 2a of the color filter substrate 2 to seal the cell formed by the array substrate 1 and the color filter substrate 2. An electrostatic protection layer 11 is also disposed at the peripheral area 1a of the array substrate 1. A peripheral circuit 1c is disposed at the peripheral area 1a of the array substrate 1. The electrostatic protection layer 11 is configured to cover the peripheral circuit 1c to provide electrostatic protection for the peripheral circuit 1c. The peripheral circuit includes, but is not limited to, a gate line bonding structure, a data line bonding structure, a common line bonding structure, a gate driver and a source driver.

In the LCD panel provided by the embodiment of the present disclosure, the electrostatic protection layer 11 is disposed at the peripheral area 1a of the array substrate 1. By adoption of the electrostatic protection layer 11, the peripheral circuit 1c on the array substrate can be effectively protected from being affected by static electricity, so that the product quality of the LCD panel can be improved.

Figure 2:
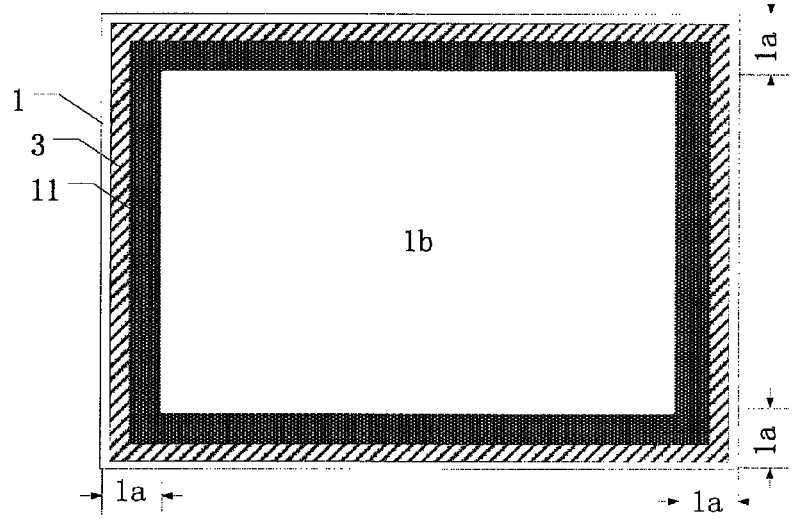
FIG. 2 is a schematic structural view of an array substrate in the LCD panel as shown in FIG. 1.

In the LCD panel provided by the embodiment of the present disclosure, the electrostatic protection layer on the array substrate may be formed after all the other functional layers on the array substrate are formed. For instance, one photoresist layer may be coated on the array substrate; the photoresist layer in a display area of the array substrate and a photoresist layer on a bonding pad are removed by development after exposure and development; and the electrostatic protection layer is formed by a retained photoresist layer in the peripheral area. For instance, the electrostatic protection layer may be made from black photoresist commonly used in the display field. Optionally, in the encapsulation process, in order to avoid adverse encapsulation due to the shielding of ultraviolet light for irradiating the sealant, as shown in FIGS. 1 and 2, the array substrate 1 includes a display area 1*b* and the peripheral area 1*a* on the periphery of the display area 1*b*, and the electrostatic protection layer 11 is disposed in an area except the sealant 3 on the peripheral area 1*a*.

Figure 3:
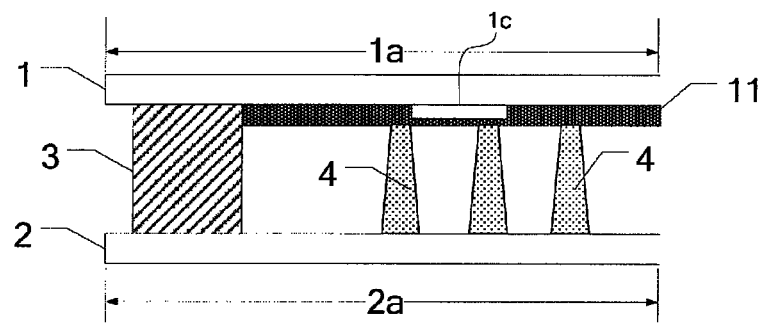
FIG. 3 is a schematic structural partial view of another LCD panel provided by the embodiment of the present disclosure.

FIG. 3 is a schematic structural partial view of another LCD panel provided by the embodiment of the present disclosure. The LCD panel comprises an array substrate 1 and a color filter substrate 2 which are cell-assembled. Liquid crystals are filled between the array substrate 1 and the color filter substrate 2. A sealant 3 is disposed between a peripheral area 1*a* of the array substrate 1 and a peripheral area 2*a* of the color filter substrate 2 to seal the cell formed by the array substrate 1 and the color filter substrate 2. Gaps between the two substrates are maintained by a plurality of mutually nested annular support structures 4.

Wherein, an electrostatic protection layer 11 is disposed in the peripheral area of the array substrate 1; a peripheral circuit 1*c* is disposed in the peripheral area 1*a* of the array substrate 1; and the electrostatic protection layer 11 is configured to cover the peripheral circuit 1*c* to provide electrostatic protection for the peripheral circuit 1*c*.

Figure 4:
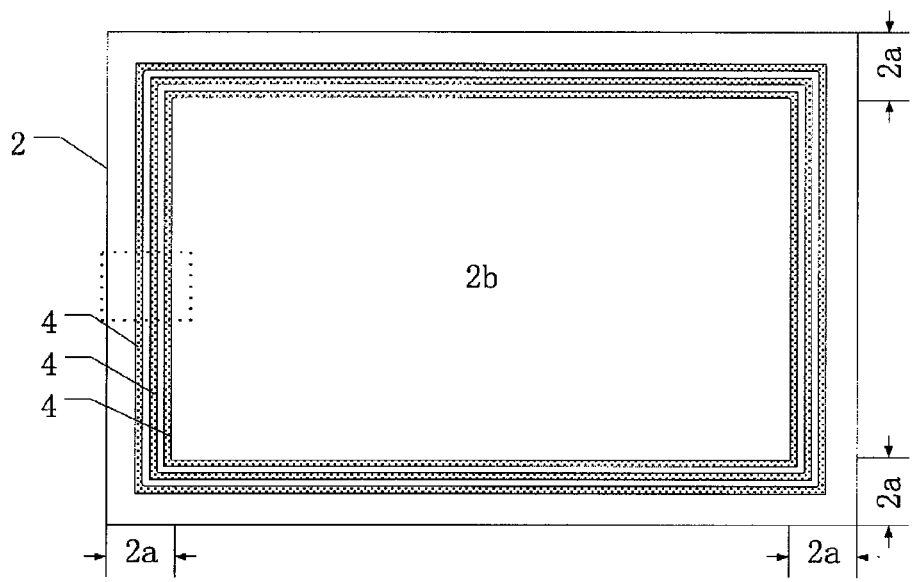
FIG. 4 is a schematic structural view of a color filter substrate in the LCD panel as shown in FIG. 3.
Figure 5:
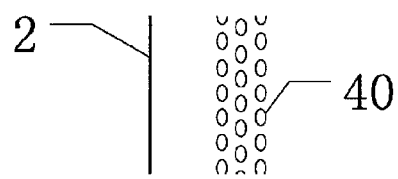
FIG. 5 is a schematic enlarged view of a structure in the dotted line frame in FIG. 4.

As illustrated in FIG. 4, the color filter substrate 2 includes a display area 2*b* and a peripheral area 2*a* disposed on the periphery of the display area 2*b*. The lower part of the annular support structure 4 is fixed at the peripheral area of the color filter substrate 2 and the upper part makes contact with the array substrate 1 so as to realize the supporting function. For instance, each annular support structure 4 is formed by a plurality of post-spacers encircling the periphery of the display area of the color filter substrate, and post-spacers in two adjacent annular support structures are staggered. For instance, as shown in FIG. 5 which is a schematic enlarged view of a dotted line frame in FIG. 4, post-spacers 40 in two adjacent annular support structures are staggered so as to have the function of a post-spacer wall (a barrier wall formed by the spacers), and hence adverse effects such as liquid crystal leakage and bubbles produced by the breakage of the sealant can be reduced, and consequently the product quality can be improved.

Figure 6:
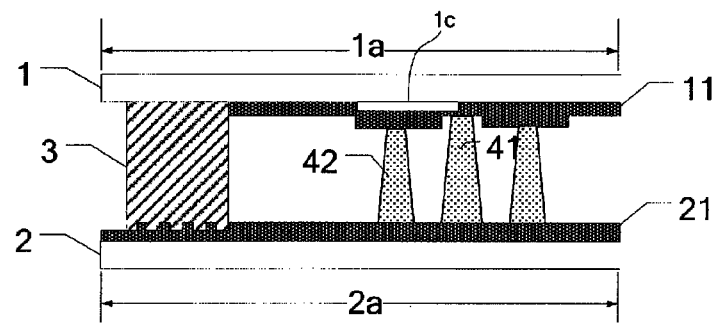
FIG. 6 is a schematic structural partial view of still another LCD panel provided by the embodiment of the present disclosure.

FIG. 6 is a schematic structural partial view of still another LCD panel provided by the embodiment of the present disclosure. The LCD panel comprises an array substrate 1 and a color filter substrate 2 which are cell-assembled. Liquid crystals are filled between the array substrate 1 and the color filter substrate 2. A sealant 3 is disposed between a peripheral area 1*a* of the array substrate 1 and a peripheral area 2*a* of the color filter substrate 2 to seal the cell formed by the array substrate 1 and the color filter substrate 2. Gaps between the two substrates are maintained by a plurality of mutually nested annular support structures 4. Each annular support structure 4 is formed by a plurality of post-spacers encircling the periphery of a display area of the color filter substrate.

An electrostatic protection layer 11 is disposed at the peripheral area 1*a* of the array substrate 1; a peripheral circuit 1*c* is disposed in the peripheral area 1*a* of the array substrate 1; the electrostatic protection layer 11 is configured to cover the peripheral circuit 1*c* to provide electrostatic protection for the peripheral circuit 1*c*; and the surface of the electrostatic protection layer 11 has a concave-convex structure.

Post-spacers in each annular support structure 4 include a main post-spacer 41 and auxiliary post-spacers 42 of which the height is less than that of the main post-spacer 41; the lower part of the main post-spacer 41 is fixed at the peripheral area 2*a* of the color filter substrate and the upper part is directly opposite to and makes contact with a concave area on the surface of the electrostatic protection layer 11; and the lower part of the auxiliary post-spacer 42 is fixed at the peripheral area 2*a* of the color filter substrate and the upper part is directly opposite to and makes contact with a convex area on the surface of the electrostatic protection layer 11.

In the LCD panel provided by the embodiments of the present disclosure, the electrostatic protection layer is disposed at the peripheral area of the array substrate and can effectively protect the peripheral circuit on the array substrate from being affected by static electricity and hence improve the product quality of the LCD panel. In addition, a concave-convex structure may also be formed on the surface of the electrostatic protection layer; main post-spacers are directly opposite to concave areas on the surface of the electrostatic protection layer; and auxiliary post-spacers are directly opposite to convex areas on the surface of the electrostatic protection layer. Therefore, not only the anti-pressure ability of the peripheral area of the LCD panel can be improved but also the displacement of the color filter substrate and the array substrate in the direction parallel to the substrates after cell-assembly can be avoided. Moreover, in the manufacturing process of the array substrate, the height of the convex areas (or the depth of the concave areas) on the surface of the electrostatic protection layer may also be adjusted to allow the cell gap on the periphery of the LCD panel formed after cell-assembly to be consistent with that of a display area (active area, AA area for short), and hence adverse effects caused by uneven cell gap on the periphery can be reduced.

Figure 7:
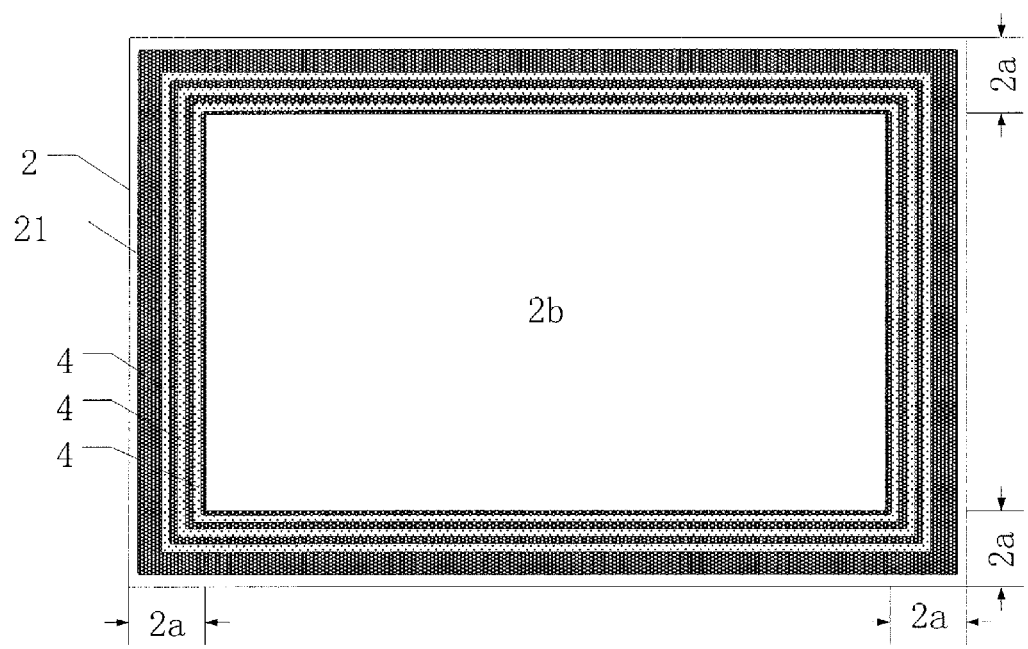
FIG. 7 is a schematic structural view of a color filter substrate in the LCD panel as shown in FIG. 6.

A color filter layer and a black matrix layer are disposed in a display area of the color filter substrate. For instance, as shown in FIGS. 6 and 7, the black matrix layer 21 is also disposed at the peripheral area 2*a* of the color filter substrate. Moreover, the surface of an area of the black matrix layer 21 making contact with the sealant has a concave-convex structure. Therefore, the contact area between the sealant 3 and the color filter substrate 2 and the roughness of the film surface can be increased, and hence the sealability between the sealant 3 and the color filter substrate 2 can be improved.

The embodiment of the present disclosure further provides a display device, which comprises the foregoing LCD panel, wherein the display device provided by the embodiment of the present disclosure may be any product or component with display function such as a notebook computer display, an LCD, an LCD TV, a digital picture frame, a mobile phone and a tablet PC.

The embodiment of the present disclosure further provides a method for manufacturing an LCD panel, which may comprise the following steps:

S1: forming an electrostatic protection layer at a peripheral area of an array substrate, in which the electrostatic protection layer is configured to cover a peripheral circuit at the peripheral area of the array substrate to provide electrostatic protection for the peripheral circuit;

S2: coating a sealant on the peripheral area of one of the array substrate and the color filter substrate, dropping liquid crystal (e.g., one-drop-filing (ODF)) on the other substrate, and allowing the array substrate and the color filter substrate to be cell-assembled; and S3: performing a curing process on the sealant to seal a cell formed by the array substrate and the color filter substrate.

In step S1, the electrostatic protection layer may be made from black photoresist and is formed in an area except the sealant on the peripheral area of the array substrate after the cell-assembly of the array substrate and the color filter substrate, so that adverse encapsulation due to the shielding of ultraviolet light for irradiating the sealant can be avoided in the encapsulation process. For instance, firstly, the traditional manufacturing processes of the array substrate are completed in sequence by processes such as coating, exposure, development and etching; secondly, black photoresist is coated on the array substrate; thirdly, exposure is performed by half-tone process; and fourthly, photoresist in a display area and an area coated by the sealant is removed by processes such as development, and hence the electrostatic protection layer can be formed on the periphery of the array substrate.

For instance, as for the color filter substrate, a plurality of mutually nested annular support structures are formed at the peripheral area of the color filter substrate, and each annular support structure is formed by a plurality of post-spacers encircling the periphery of the display area of the color filter substrate. As post-spacers in two adjacent annular support structures are staggered, the adverse effects such as liquid crystal leakage and bubbles produced by the breakage of the sealant can be reduced, and hence the product quality can be improved.

For instance, each annular support structure includes a main post-spacer and auxiliary post-spacers of which the height is less than that of the main post-spacer; the surface of the electrostatic protection layer on the array substrate has a concave-convex structure; and after cell-assembly, the main post-spacer is directly opposite to a concave area on the surface of the electrostatic protection layer, and the auxiliary post-spacer is directly opposite to a convex area on the surface of the electrostatic protection layer. In the manufacturing process of the electrostatic protection layer, the width and the thickness of the electrostatic protection layer and the height of the convex areas (or the depth of the concave areas) on the surface may be controlled by the design of a mask or the adjustment of exposure parameters.

For instance, a color filter layer and a black matrix layer are formed in the display area of the color filter substrate; the black matrix layer is also formed at a position, directly opposite to the sealant, on the peripheral area of the color filter substrate; and the surface of an area of the black matrix layer making contact with the sealant has a concave-convex structure after cell-assembly. For instance, the color filter substrate may be manufactured by the following method: firstly, depositing materials for forming a black matrix on a glass substrate to form a uniform black photoresist layer; secondly, forming the conventional black matrix pattern in the display area by exposure and development and forming a concave-convex surface structure at the peripheral area of the color filter substrate; thirdly, forming an RGB color filter layer in the display area by the traditional process; fourthly, depositing materials for forming post-spacers (PSs) on the glass substrate, forming the conventional shape of post-spacers in the display area by processes such as exposure and development, and forming annular support structures at the peripheral area of the color filter substrate; and finally, forming other layers in sequence to obtain the color filter substrate.

The foregoing is only the preferred embodiments of the present disclosure and not intended to limit the scope of protection of the present disclosure. The scope of protection of the present disclosure should be defined by the appended claims.

The application claims priority to the Chinese patent application No. 201510119707.9, filed Mar. 18, 2015, the disclosure of which is incorporated herein by reference as part of the application.

The invention claimed is:

1. A liquid crystal display (LCD) panel, comprising an array substrate and a color filter substrate which are cell-assembled,
   wherein liquid crystals are filled between the array substrate and the color filter substrate;
   a sealant is disposed between peripheral areas of the array substrate and the color filter substrate to seal a cell formed by the array substrate and the color filter substrate; and
   an electrostatic protection layer is further disposed at the peripheral area of the array substrate and configured to cover a peripheral circuit provided at the peripheral area of the array substrate to provide electrostatic protection for the peripheral circuit;
   wherein a plurality of mutually nested annular support structures are disposed at the peripheral area of the color filter substrate; each of the annular support structures is formed by a plurality of post-spacers encircling a periphery of a display area of the color filter substrate; and the post-spacers in two adjacent annular support structures are staggered with each other; and
   each of the annular support structures includes a main post-spacer and an auxiliary post-spacer of which the height is less than that of the main post-spacer; the surface of the electrostatic protection layer on the array substrate is concave-convex;
   said main post-spacer is directly opposite to a concave area on the surface of the electrostatic protection layer; and
   said auxiliary post-spacer is directly opposite to a convex area on the surface of the electrostatic protection layer.

2. The LCD panel according to claim 1, wherein the electrostatic protection layer is made from black photoresist; and the electrostatic protection layer is disposed in an area except the sealant at the peripheral area of the array substrate.

3. The LCD panel according to claim 1, wherein a color filter layer and a black matrix layer are disposed in the display area of the color filter substrate; the black matrix layer is also disposed at a position, directly opposite to the sealant, on the peripheral area of the color filter substrate; and the surface of an area of the black matrix layer making contact with the sealant is concave-convex.

4. A display device, comprising the LCD panel according to claim 1.

5. A method for manufacturing a liquid crystal display (LCD) panel, comprising:
   forming an electrostatic protection layer at a peripheral area of an array substrate, in which the electrostatic protection layer is configured to cover a peripheral circuit at the peripheral area of the array substrate to provide electrostatic protection for the peripheral circuit;
   coating a sealant on the peripheral area of one of the array substrate and the color filter substrate, dropping liquid crystal on the other substrate, and allowing the array substrate and the color filter substrate to be cell-assembled; and
   performing a curing process on the sealant to seal a cell formed by the array substrate and the color filter substrate;

wherein a plurality of mutually nested annular support structures are formed at the peripheral area of the color filter substrate; each of the annular support structures is formed by a plurality of post-spacers encircling the periphery of a display area of the color filter substrate; and post-spacers in two adjacent annular support structures are staggered with each other; and each annular support structure includes a main post-spacer and an auxiliary post-spacer of which the height is less than that of the main post-spacer;

the surface of the electrostatic protection layer on the array substrate is concave-convex; and after the color filter substrate and the array substrate are cell-assembled, the main post-spacer is directly opposite to a concave area on the surface of the electrostatic protection layer, and the auxiliary post-spacer is directly opposite to a convex area on the surface of the electrostatic protection layer.

6. The method for manufacturing the LCD panel according to claim 5, wherein the electrostatic protection layer is made from black photoresist and formed in an area except the sealant on the peripheral area of the array substrate after the cell-assembly.

7. The method for manufacturing the LCD panel according to claim 5, wherein a color filter layer and a black matrix layer are formed in a display area of the color filter substrate; the black matrix layer is also formed at a position, directly opposite to the sealant, on the peripheral area of the color filter substrate; and the surface of an area of the black matrix layer making contact with the sealant is concave-convex after the color filter substrate and the array substrate are cell-assembled.

* * * * *